United States Patent
Matsuo et al.

(10) Patent No.: US 9,428,240 B2
(45) Date of Patent: Aug. 30, 2016

(54) VEHICLE BODY FRAME FOR A SADDLE-RIDE TYPE VEHICLE, AND MOTORCYCLE INCLUDING SAME

(71) Applicant: HONDA MOTOR CO., LTD., Minato-Ku, Tokyo (JP)

(72) Inventors: Tomoya Matsuo, Wako (JP); Yusuke Inoue, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/666,355

(22) Filed: Mar. 24, 2015

(65) Prior Publication Data
US 2015/0274244 A1 Oct. 1, 2015

(30) Foreign Application Priority Data
Mar. 28, 2014 (JP) ................................ 2014-069190

(51) Int. Cl.
*B62K 19/20* (2006.01)
*B62K 11/04* (2006.01)

(52) U.S. Cl.
CPC ............... *B62K 19/20* (2013.01); *B62K 11/04* (2013.01)

(58) Field of Classification Search
CPC ........ B62K 5/027; B62K 5/05; B62K 11/04; B62K 11/02; B62K 11/10; B62K 11/06; B62K 19/18; B62K 19/20
USPC ........................................ 180/210, 216, 217
See application file for complete search history.

(56) References Cited

U.S. PATENT DOCUMENTS

| 4,740,004 | A * | 4/1988 | McMullen | B62K 5/05 280/124.103 |
|---|---|---|---|---|
| 8,991,542 | B2 * | 3/2015 | Yu | B62K 5/027 180/209 |
| 2008/0164085 | A1 * | 7/2008 | Cecinini | B60G 21/007 180/210 |
| 2013/0168944 | A1 * | 7/2013 | Bartolozzi | B60G 3/01 280/269 |
| 2015/0239522 | A1 * | 8/2015 | Iizuka | B62K 5/027 280/267 |
| 2015/0259027 | A1 * | 9/2015 | Takano | B62K 5/05 280/267 |
| 2015/0291241 | A1 * | 10/2015 | Takano | B62K 5/05 280/5.509 |
| 2015/0298736 | A1 * | 10/2015 | Sasaki | B62J 15/00 280/124.103 |
| 2015/0321721 | A1 * | 11/2015 | Sasaki | B62K 5/05 180/210 |
| 2015/0344097 | A1 * | 12/2015 | Iizuka | B62K 19/38 280/62 |

FOREIGN PATENT DOCUMENTS

JP 2000-006869 A 1/2000

* cited by examiner

*Primary Examiner* — Kevin Hurley
(74) *Attorney, Agent, or Firm* — Carrier Blackman & Associates, P.C.; Joseph P. Carrier; Anne G. Sabourin

(57) ABSTRACT

A vehicle body frame for a saddle-ride type vehicle is manufactured by laser welding, and has good dimensional accuracy in a vehicle length direction. A pivot frame includes a grooved member, a lid member put on an opening of the grooved member, and laser-weld beads with which this lid member is joined to the grooved member. The molten metal shrinks during its solidification, and shrinkage occurs in the vehicle width direction. However, no shrinkage occurs in the vehicle longitudinal direction. As a result, the distance between a head pipe and a pivot shaft is maintained properly.

11 Claims, 16 Drawing Sheets

VEHICLE BODY FRAME FOR A SADDLE-RIDE TYPE VEHICLE, AND MOTORCYCLE INCLUDING SAME

CROSS-REFERENCE TO RELATED APPLICATIONS

The present invention claims priority under 35 USC 119 based on Japanese patent application No. 2014-069190, filed on Mar. 28, 2014. The entire subject matter of this priority document, including specification claims and drawings, is incorporated by reference herein.

BACKGROUND OF THE INVENTION

1. Technical Field of the Invention

The present invention relates to a vehicle body frame structure for a saddle-ride type vehicle, and to a motorcycle incorporating the vehicle body frame.

2. Background Art

In many cases, the vehicle body frames of saddle-ride type vehicles are manufactured by welding pipe materials and tubular frames together.

Among the welding methods, arc welding has mainly been used. In recent years, however, laser welding has become common, and this laser welding has been employed for manufacturing vehicle body frames (see Patent Document 1 (FIGS. 5 and 7), for example).

FIG. 5 (A) of Patent Document 1 shows part of a vehicle body frame. This vehicle body frame is formed by making pipe materials (P1 to P4) (numbers in parenthesis represent the reference numerals described in Patent Document 1; the same applies below) face each other and then laser-welding their facing portions.

For example, each first pipe material (P1) is laser-welded to a second pipe material (P2) with a predetermined gap (clearance) kept therebetween. The end of the first pipe material (P1) and the end of the second pipe material (P2) are melted by the heat of the laser beam, and then solidified and joined to each other. In this solidification, the molten metal shrinks. Thus, though slightly, the longitudinal dimensions (the lengths in the vehicle length direction) of the first pipe material (P1) and the second pipe material (P2) shrink. The degree of this shrinkage differs depending on the conditions, thereby causing great variation. Since there are three welding spots (on each side), the longitudinal dimension varies to a great extent.

The consequence is that the distance between each reinforcing member (q) and a head pipe shown in FIG. 7 of Patent Document 1 differs from one vehicle body frame to another.

A structure is desired which is capable of suppressing the change in the length of a vehicle body frame in the vehicle length direction that occurs during the welding thereof.

[Patent Document 1] Japanese Patent Application Publication No. 2000-6869

SUMMARY OF THE INVENTION

An object of the present invention is to provide a vehicle body frame, for a saddle-ride type vehicle, which is manufactured by welding but has good dimensional accuracy in the vehicle length direction.

For the purpose of solving the above-mentioned problem, a first aspect of the present invention provides a vehicle body frame for a saddle-ride type vehicle, including: a head pipe which is rotatably supporting a steering shaft for steering a front wheel; a main frame is welded to the head pipe at a front end and extends toward a rear of the vehicle; and a pivot frame is connected to a rear portion of the main frame at a front end and extends toward the rear of the vehicle, and on which a rear wheel is supported vertically movably through a pivot shaft, in which at least one of the main frame and the pivot frame includes a grooved member having an opening facing a center of a vehicle body, a lid member put on the opening of the grooved member, and a laser-weld bead with which the lid member and the grooved member are joined to each other.

In a second aspect of the present invention, the grooved member is manufactured by any one of forging and casting and includes a web and a pair of flanges extending toward the center of the vehicle body respectively from opposite edges of the web, and the lid member is joined to the pair of flanges.

In a third aspect of the present invention, the grooved member includes a rib extending toward the center of the vehicle body from the web between the pair of flanges, and the lid member is joined to the rib.

In a fourth aspect of the present invention, the rib extends in a longitudinal direction of the grooved member.

In a fifth aspect of the present invention, the main frame is a tubular frame, and the pivot frame is the grooved member.

In a sixth aspect of the present invention, the pivot frame includes a cross member on an upper portion thereof, the cross member extending in a vehicle width direction, and the cross member is joined to the pivot frame with a laser-weld bead.

EFFECTS OF THE INVENTION

According to the first aspect of the present invention, at least one of the main frame and the pivot frame includes the grooved member, the lid member put on the opening of the grooved member, and the laser-weld bead with which the lid member is joined to the grooved member.

The molten metal shrinks during its solidification and the shrinkage occurs in the vehicle width direction. However, no shrinkage occurs in the vehicle longitudinal direction. Thus, the distance between the head pipe and the pivot shaft is maintained properly.

Since the lid member is added to the grooved member, the rigidity is increased. Since the structure has a hollow cross section, the weight can be reduced.

Thus, with the present invention, a vehicle body frame for a saddle-ride type vehicle which is manufactured by welding but has good dimensional accuracy in the vehicle length direction is provided.

According to the second aspect of the present invention, the lid member is joined to the flanges of the grooved member. Since laser welding is employed, the lid member which is relatively thick can be joined to the flanges which are relatively thin.

In addition, the grooved member is manufactured by forging or casting and is therefore capable of mass production. The mass production provides the advantage that the unit cost can be easily reduced.

Further, in the case of a simple groove member, there is a risk that mud and the like may enter from the opening. However, the lid member closes the opening and therefore eliminates such a risk.

According to the third aspect of the present invention, the grooved member includes the rib extending toward the center of the vehicle body from the web between the pair of flanges, and the lid member is joined to the rib. Since laser welding is employed, the lid member which is relatively thick can be joined to the rib which is relatively thin. By joining the lid to the rib, the rigidity can be improved.

According to the fourth aspect of the present invention, the rib extends in the longitudinal direction of the grooved member. Since the rib extends in the longitudinal direction, it is easier for at least one of the main frame and the pivot frame to elastically bow.

According to the fifth aspect of the present invention, the main frame is a tubular frame, and the pivot frame is the grooved member. The pivot frame is the grooved member with the lid member attached thereto and therefore has a structure with a closed cross section. Thus, the rigidity can be increased.

According to the sixth aspect of the present invention, the pivot frame includes the cross member, and the cross member is joined to the pivot frame with a laser-weld bead. Since the cross member is joined to the pivot frame, the rigidity of the pivot frame can be further increased.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

An embodiment of the present invention will now be described, with reference to the drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

Figure 1:
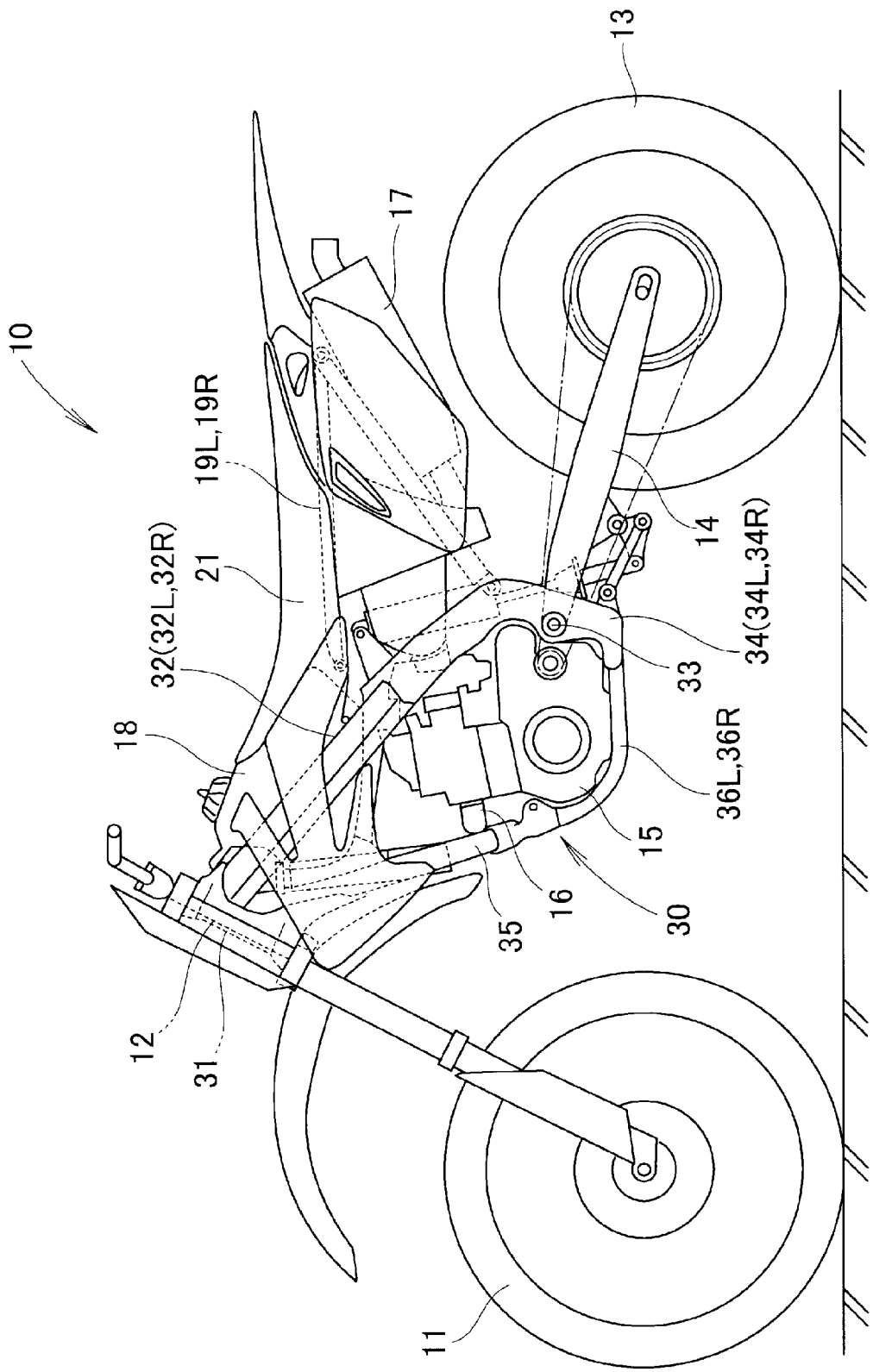
FIG. 1 is a left-side plan view of a saddle-ride type vehicle according to a selected illustrative embodiment of the present invention.

As shown in FIG. 1, a saddle-ride type vehicle 10 is a vehicle including, as its main part, a vehicle body frame 30 including: a head pipe 31 which is rotatably supporting a steering shaft 12 for steering a front wheel 11; a main frame 32 welded to this head pipe 31 at the front end and extending toward the rear of the vehicle; and a pivot frame 34 connected to a rear portion of this main frame 32 at the front end and extending toward the rear of the vehicle.

The pivot frame 34 is provided with a pivot shaft 33. A swing arm 14 is pivotally attached, so as to be vertically swingably movable, to this pivot shaft 33. A rear wheel 13 is attached to an end of the swing arm 14 opposite the pivot frame.

In this embodiment, the main frame 32 is formed by a left main frame 32L (L is a suffix letter representing left; the same applies below) and a right main frame 32R (R is a suffix letter representing right; the same applies below). Left and right pivot frames 34L, 34R are connected to the rear portions of the left and right main frames 32L, 32R, respectively. Note that the main frame 32 may be a so-called center frame with a structure which is a single longitudinal frame extending along the center in the vehicle width direction.

Preferably, a space for housing an engine 15 is formed by extending a down frame 35 downward from the head pipe 31, extending left and right lower frames 36L, 36R toward the rear of the vehicle body from a lower portion of this down frame 35, and connecting the left and right lower frames 36L, 36R to the left and right pivot frames 34L, 34R, respectively.

The engine 15 is supported on the vehicle body frame 30 in such a way as to be housed in this space formed therein, and an exhaust pipe 16 is extended from the engine 15. This exhaust pipe 16 extends toward the rear of the vehicle by passing by a lateral side (the right side in this example) of the engine 15. A silencer 17 is attached to a rear portion of the exhaust pipe 16.

Moreover, a fuel tank 18 is attached behind the head pipe 31 and between the left and right main frames 32. Seat frames 19L, 19R are extended from the rear portions of the main frames 32L, 32R or from upper portions of the pivot frames 34L, 34R, respectively. A seat 21 for the occupant to sit is placed on the seat frames 19L, 19R and supported on the seat frames 19L, 19R.

Figure 2:
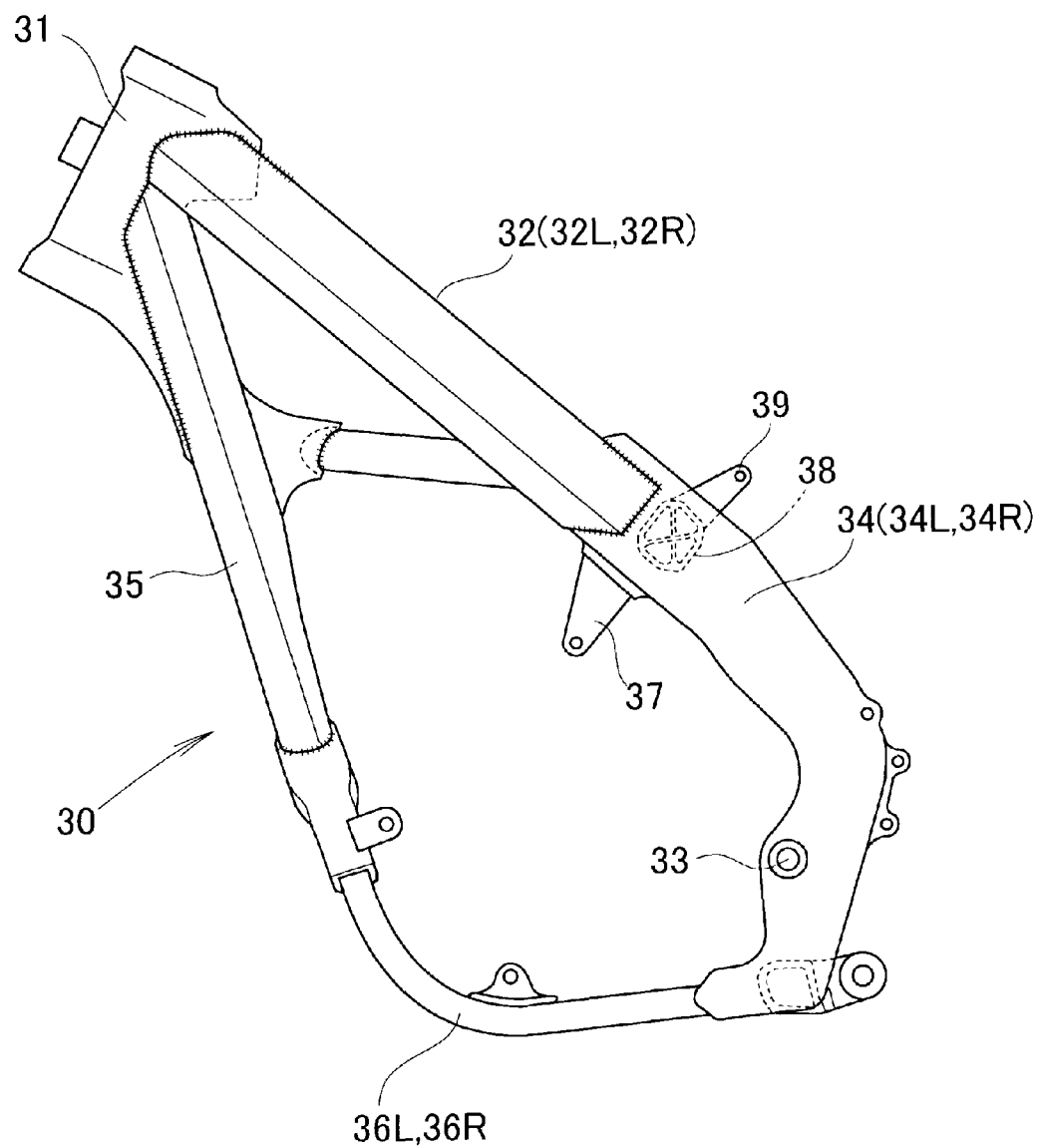
FIG. 2 is a view showing a vehicle body frame, which is a component of the saddle-ride type vehicle of FIG. 1.

As shown in FIG. 2, the vehicle body frame 30 includes: the head pipe 31; the left and right main frames 32L, 32R extending toward the rear of the vehicle from the head pipe 31; the left and right pivot frames 34L, 34R respectively attached to and extending downward from rear portions of the main frames 32L, 32R; the down frame 35 extending obliquely downward from the head pipe 31; and the lower frames 36L, 36R extending from the rear portion of the down frame 35 and connected to the pivot frames 34L, 34R.

The vehicle body frame 30 further includes an engine hanger 37 on an upper portion of each of the left and right pivot frames 34L, 34R, and a cross member 38 extending between the upper portions of the left and right pivot frames 34L, 34R. This cross member 38 is a member for supporting a cushion bracket 39.

The left main frame 32L is a tubular member extending from the head pipe 31 toward the rear of the vehicle. The right main frame 32R is similarly a tubular member as well.

In addition, the left pivot frame 34L includes a grooved member 40 manufactured by forging or casting as its main element. The grooved member 40 is disposed such that its opening faces the center of the vehicle body. The right pivot frame 34R is similar as well.

Figure 3:
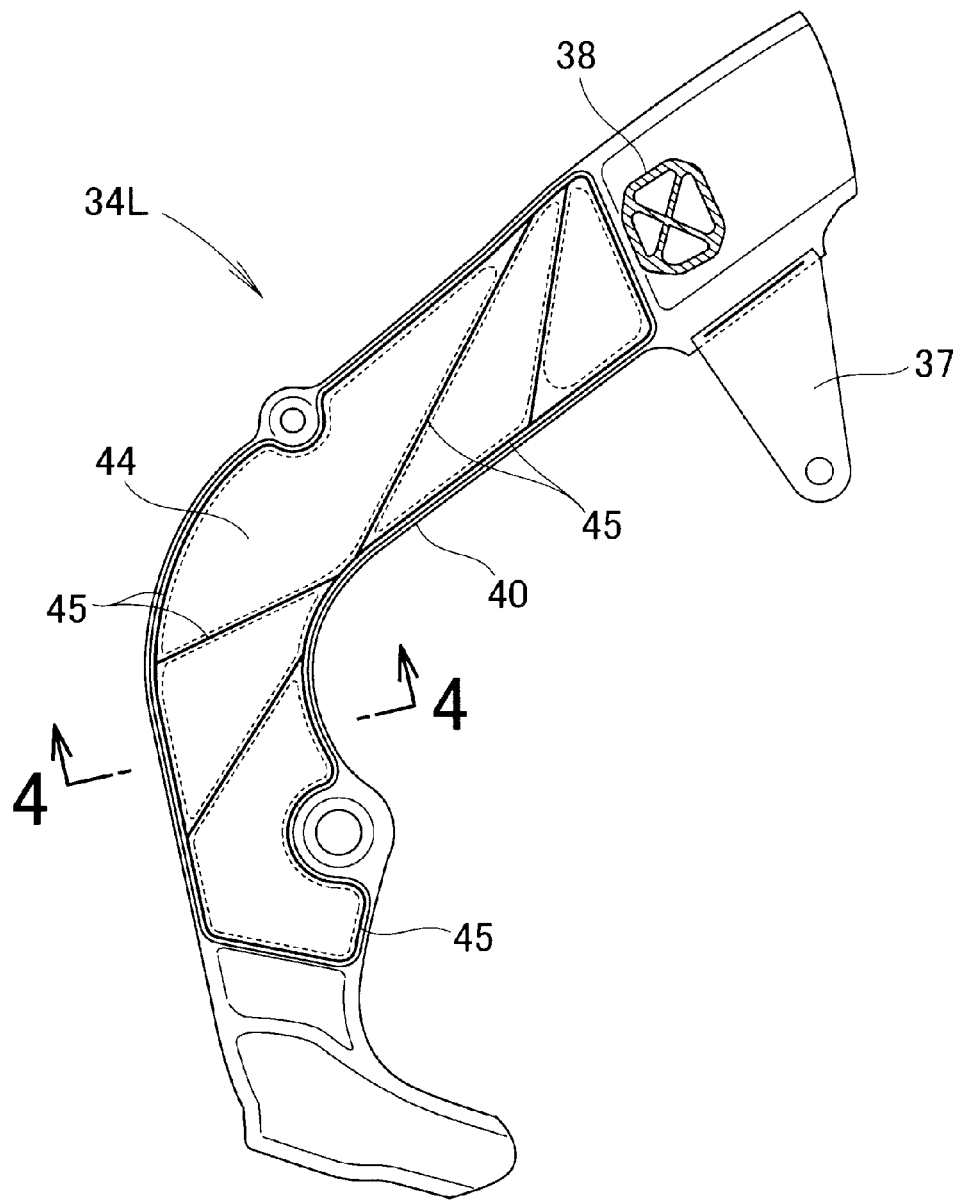
FIG. 3 is a side plan view of a left pivot frame which is a component of the vehicle body frame of FIG. 2, as seen from a central part of the vehicle body frame.

As shown in FIG. 3, as seen from a central portion of the vehicle body frame 30, the left pivot frame 34L includes the grooved member 40, a lid member 44 closing the opening, and laser-weld beads 45 with which the lid member 44 is joined to the grooved member 40. The right pivot frame 34R is similar as well, and description thereof is therefore omitted below.

Figure 4:
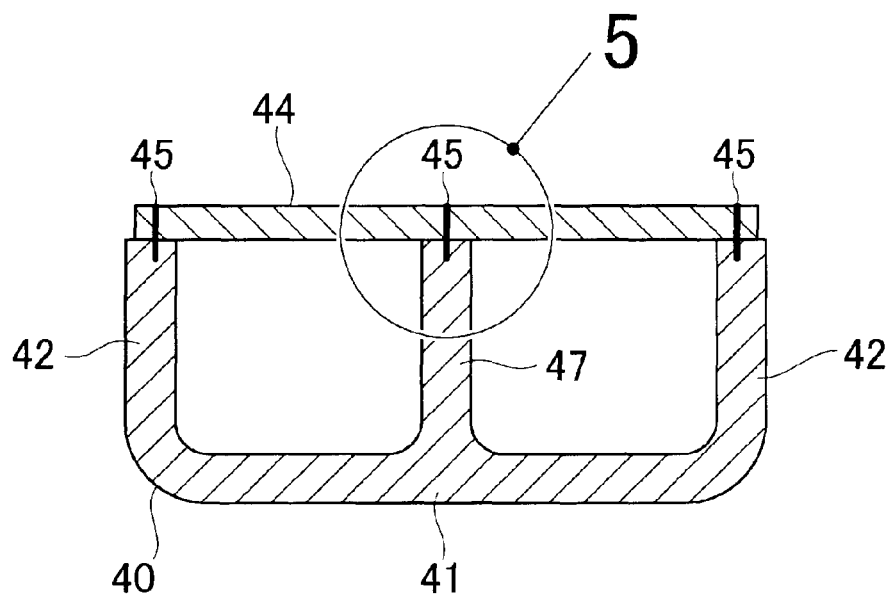
FIG. 4 is a cross-sectional view of the pivot frame of FIG. 3, taken along a line 4-4 in FIG. 3.

As shown in FIG. 4 which is a cross-sectional view taken along a line 4-4 in FIG. 3, the grooved member 40 includes a web 41 and a pair of flanges 42, 42 extending upward (toward the center of the vehicle body in FIG. 3) from opposite edges of this web 41. In FIG. 4, the grooved member 40 is open upward and can therefore be manufactured easily by forging or casting.

The grooved member 40 preferably includes a rib 47 extending from the web 41 between the pair of flanges 42, 42. This rib 47 extends as long as the flanges 42, 42.

Figure 5:
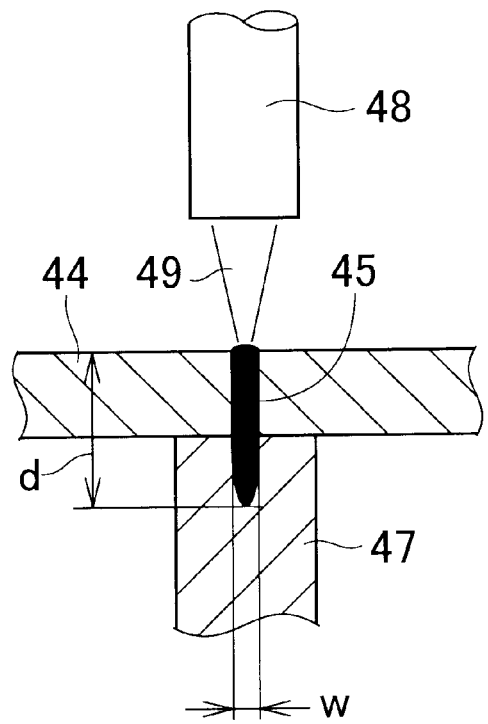
FIG. 5 is an enlarged detail view of an area 5 in FIG. 4, shown during welding thereof.

As shown in FIG. 5, the lid member 44 is placed on the rib 47, and a laser beam 49 is emitted downward from a laser-welding torch 48 above them. Having a significantly high energy density, the laser beam 49 melts the lid member 44 and then melts the rib 47. As a result, the laser-weld beads 45 are obtained. These laser-weld beads 45 continue to the far side of FIG. 5. Since the laser beam 49 is converged, a bead width w of the laser-weld bead 45 is small (narrow) and a bead depth d of the laser-weld bead 45 is large (long). Accordingly, the lid member 44, which is relatively thick, can be joined to the rib 47 which is relatively thin.

The cross-sectional area (w×d) of each laser-weld bead 45 is significantly smaller than that of an arc-weld bead. For this reason, the shrinkage during the solidification is small. Thus, there is no risk that waviness may appear on the lid member 44 after the welding.

As shown in FIG. 4, the left pivot frame 34L includes: the grooved member 40 having its opening facing the center of the vehicle body; the lid member 44 put on the opening of the grooved member 40; and the laser-weld beads 45 with which the lid member 44 is joined to the grooved member 40.

The closed space formed by the web 41, the flanges 42, 42, and the lid member 44 can increase the rigidity of the left pivot frame 34L. For example, the web 41, the flanges 42, 42, and/or the lid member 44 may be formed thin partly or entirely. In this way, the weight of the left pivot frame 34L can be reduced. The same applies to the right pivot frame 34R.

The left and right main frames 32L, 32R in FIG. 2 may have the structure in FIG. 4. Moreover, the left main frame 32L and the left pivot frame 34L can both have the structure in FIG. 4. The same applies to the right main frame 32R and the right pivot frame 34R.

The rib 47 mentioned above can be omitted. Moreover, the laser-weld beads 45 can instead be formed as fillet-weld beads. A specific example of such a case will be described with reference to drawings.

Figure 6:
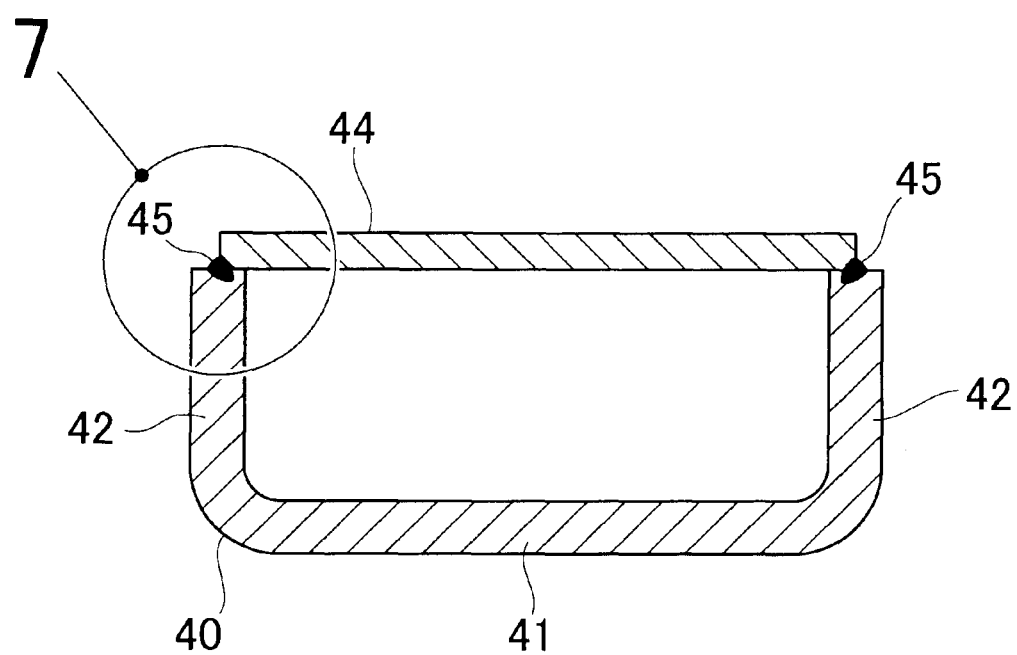
FIG. 6 is a cross-sectional view similar to FIG. 4, showing a modified version of the left pivot frame.

As shown in FIG. 6, the grooved member 40 is formed by the web 41 and the pair of flanges 42, 42.

Figure 7:
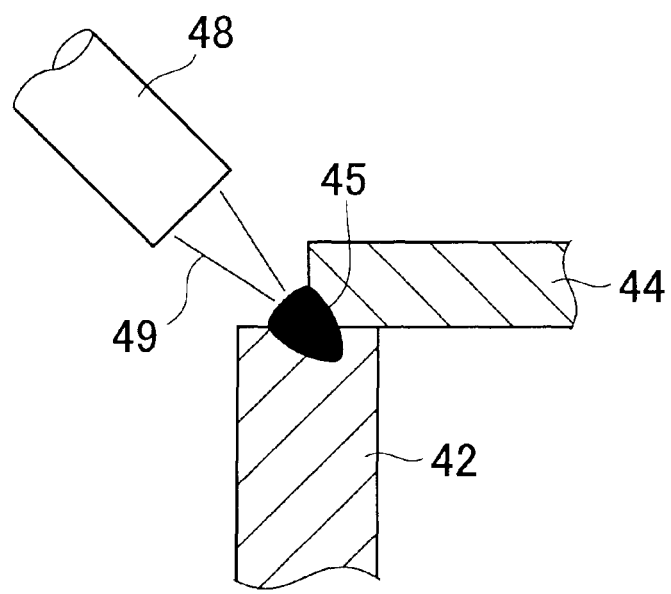
FIG. 7 is an enlarged detail view of an area 7 in FIG. 6, shown during welding thereof.

As shown in FIG. 7, the lid member 44 is placed on the flanges 42 and a laser beam 49 is emitted from the laser-welding torch 48. As a result, fillet laser-weld beads 45 are formed.

With these fillet laser-weld beads 45, there is no need to melt and penetrate the lid member 44 with the heat of the laser beam 49. The cross-sectional area of each bead is reduced, and therefore the welding distortion can be further reduced.

Accordingly, the welding time can be shortened, and the productivity can therefore be improved.

Next, a modification of the rib will be described.

Figure 8:
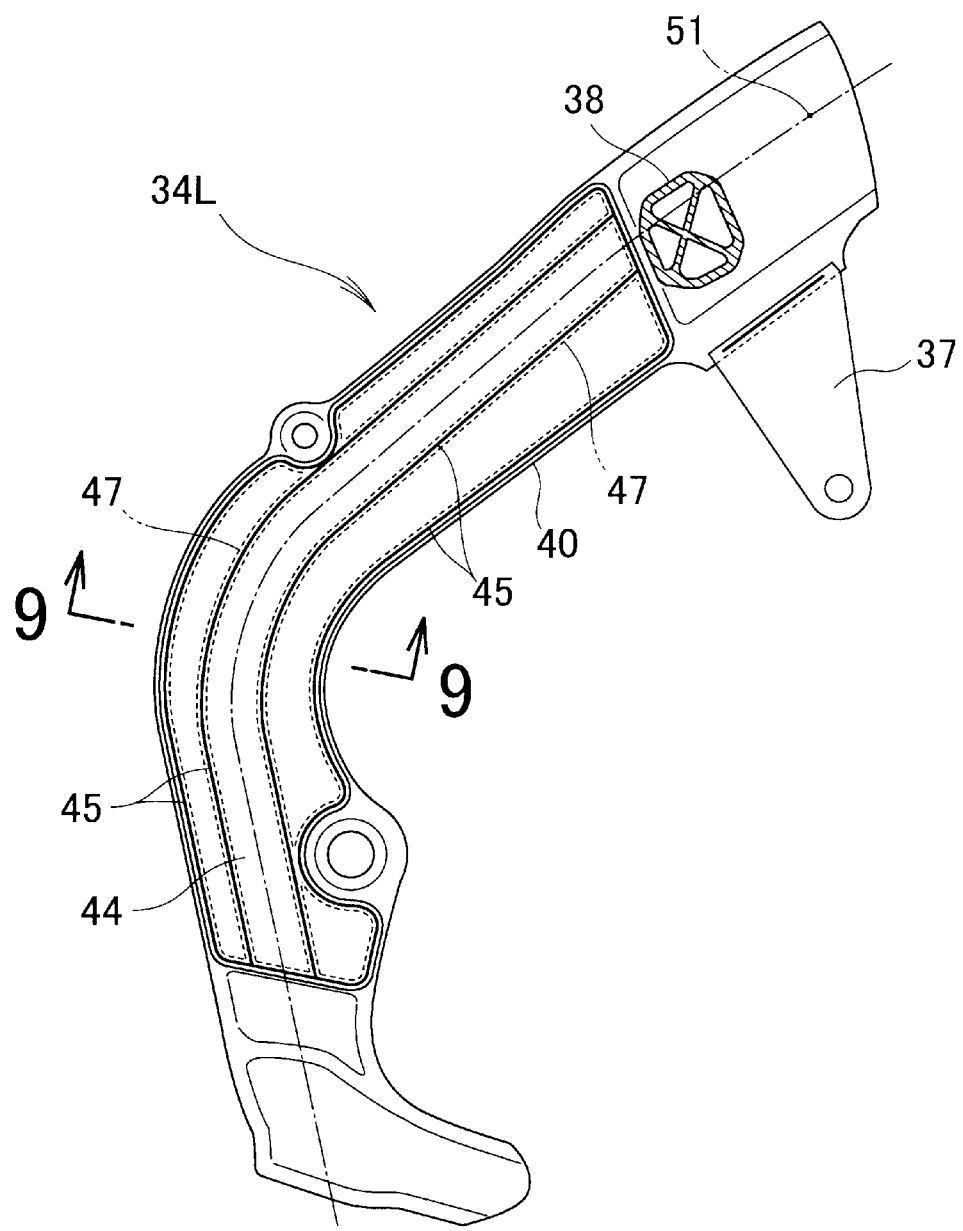
FIG. 8 is a side plan view similar to FIG. 3, showing another modification of the left pivot frame.

As shown in FIG. 8, ribs 47, 47 are extended in the longitudinal direction of the left pivot frame 34L (to be precise, extended along a longitudinal axis 51). In this way, it is easier for the left pivot frame 34L to elastically bend (bow).

Figure 9:
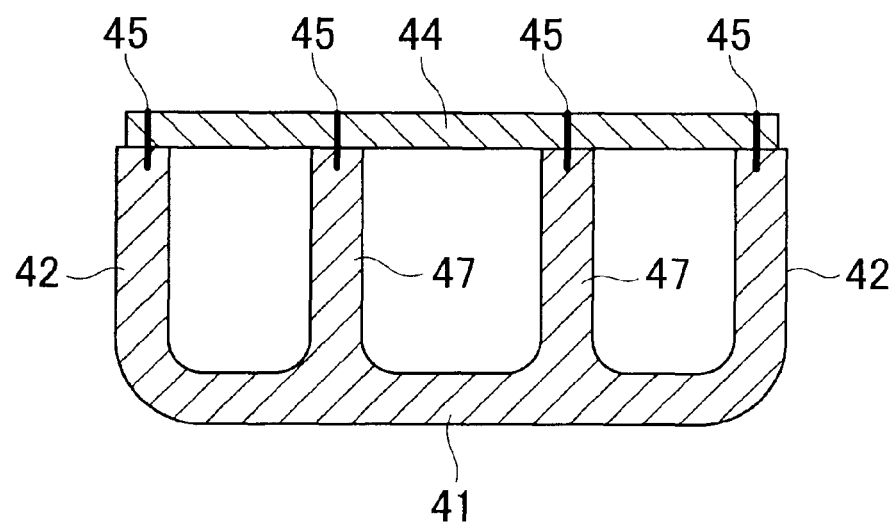
FIG. 9 is a cross-sectional view of the pivot frame of FIG. 8, taken along a line 9-9 in FIG. 8.

As shown in FIG. 9, the lid member 44 is joined to the flanges 42, 42 and the ribs 47, 47 with laser-weld beads 45.

Next, a method of attaching the cross member 38 shown in FIG. 2 will be described.

Figure 10:
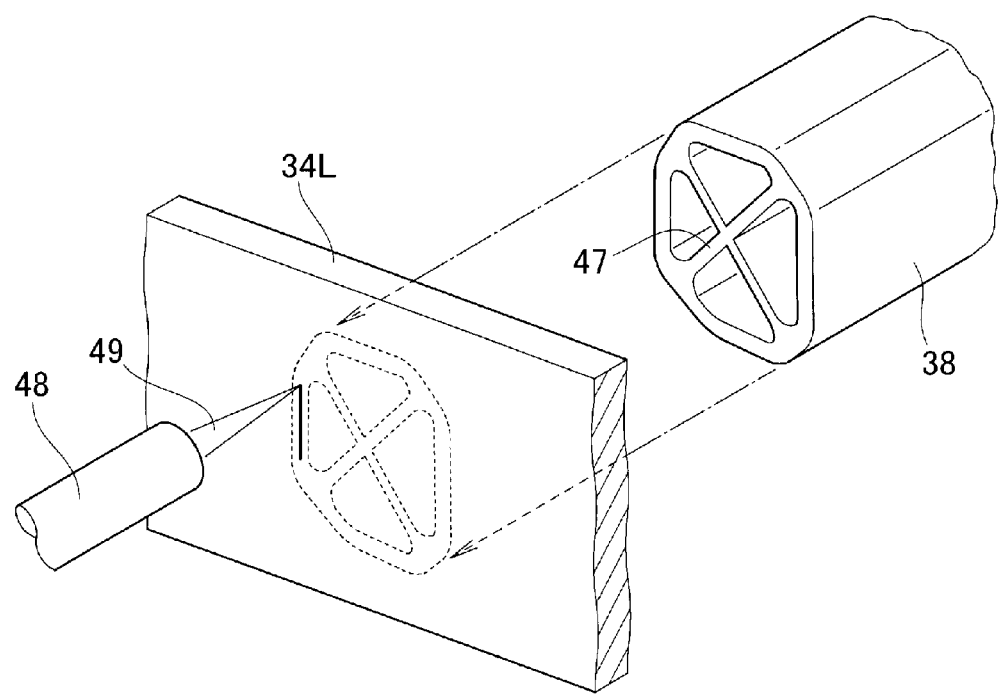
FIG. 10 is a perspective view illustrating a method of attaching a cross member to a portion of the pivot frame.

As shown in FIG. 10, the cross member 38 is brought into contact with the left pivot frame 34L and welded thereto with the laser-welding torch 48. Preferably, a tubular member is used as the cross member 38 for reducing the weight. More preferably, a tubular cross member 38 including a cross-shaped rib 47 is employed.

Figure 11:
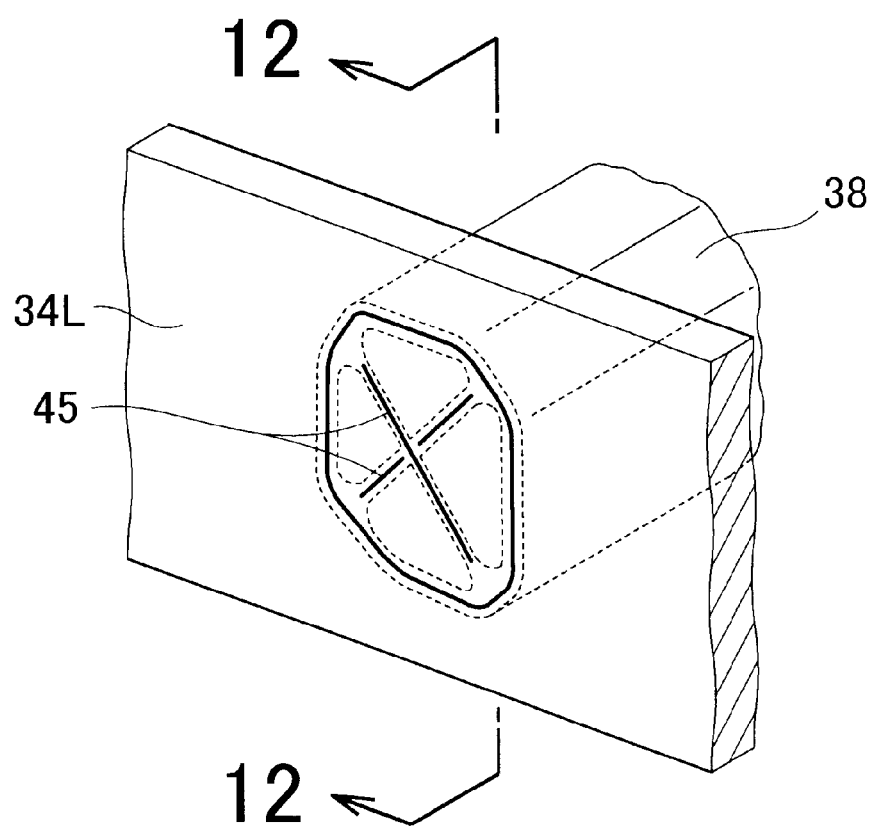
FIG. 11 is a view of the cross member attached to the pivot frame.

As shown in FIG. 11, the cross member 38 can be joined to the left pivot frame 34L with laser-weld beads 45.

Figure 12:
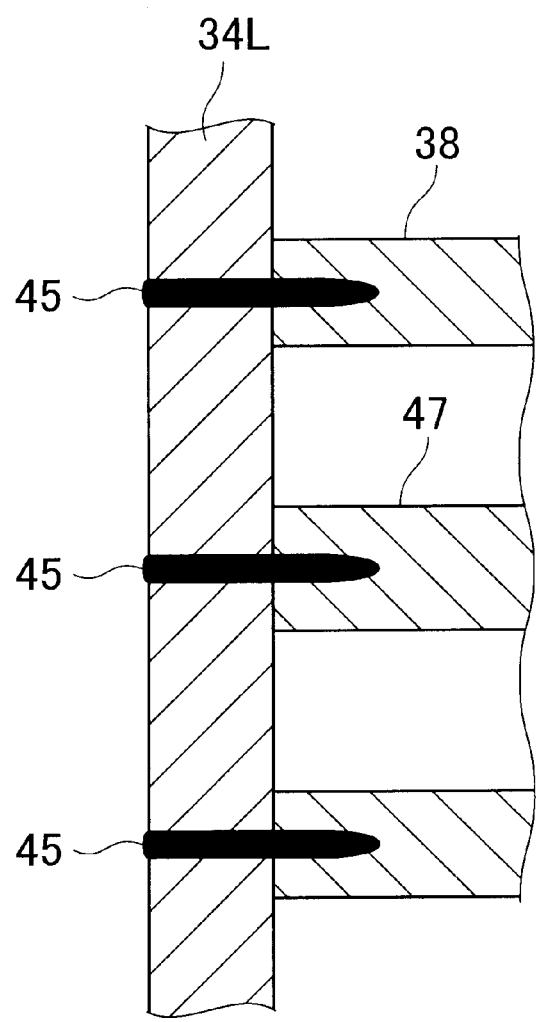
FIG. 12 is a cross-sectional view of the cross member and pivot frame, taken along a line 12-12 in FIG. 11.

Specifically, the cross member 38 is joined to the left pivot frame 34L with the laser-weld beads 45 as shown in FIG. 12 which is a cross-sectional view taken along a line 12-12 in FIG. 11. Since the laser-weld beads 45 extend in the vehicle width direction, deformation in the vehicle longitudinal direction is small.

Figure 13:
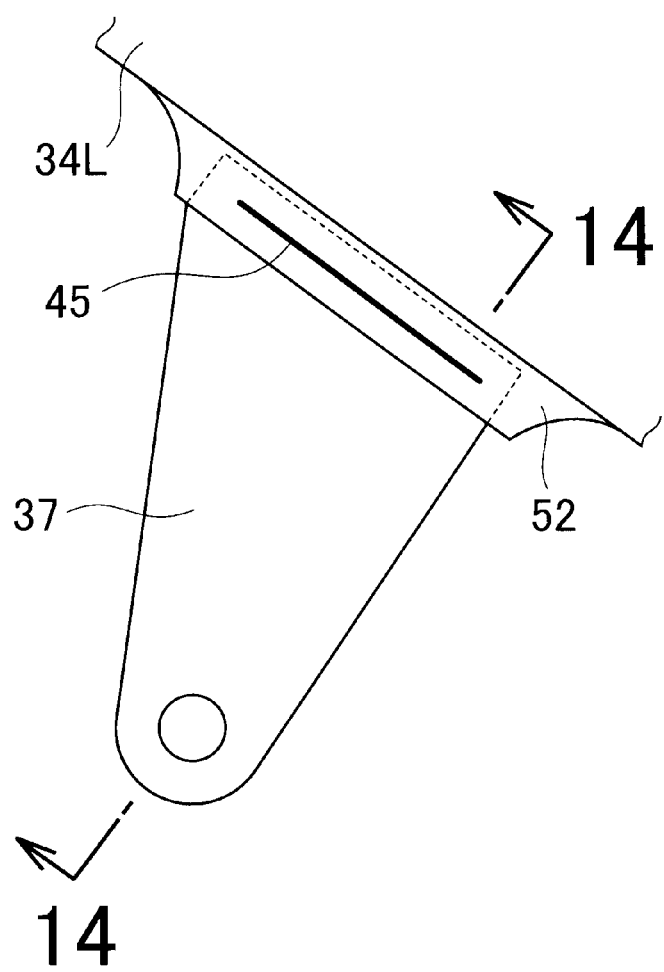
FIG. 13 is an enlarged view of an engine hanger.

Next, a method of attaching the engine hanger 37 shown in FIG. 2 will be described. As shown in FIG. 13, a tongue piece 52 is formed integrally with the left pivot frame 34L in advance. The engine hanger 37 is joined to this tongue piece 52 with a laser-weld bead 45.

Figure 14:
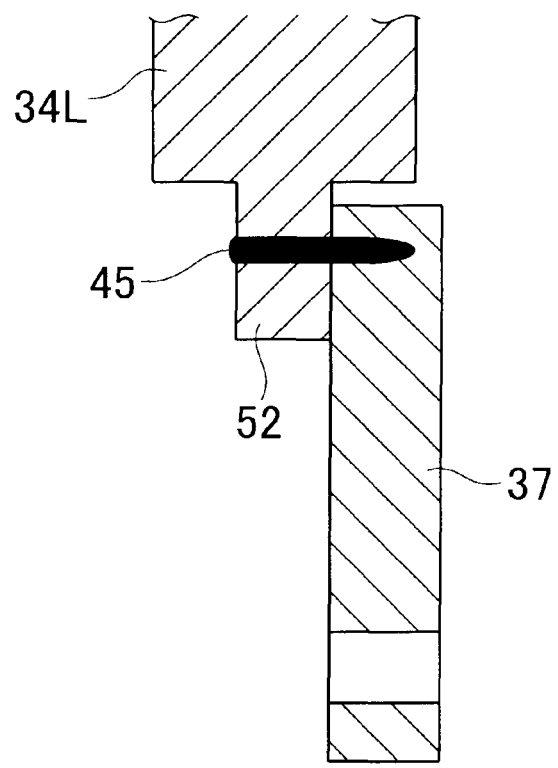
FIG. 14 is a cross-sectional view of the engine hanger, taken along a line 14-14 in FIG. 13.

Specifically, as shown in FIG. 14 which is a cross-sectional view taken along a line 14-14 in FIG. 13, the engine hanger 37 is fixed with a laser-weld bead 45 which is extended from the tongue piece 52 side.

Figure 15:
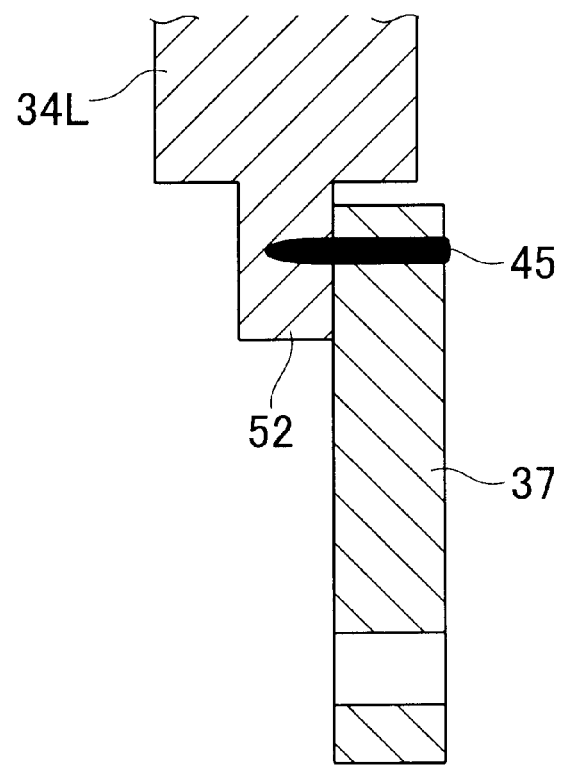
FIG. 15 is a cross-sectional view similar to FIG. 14, provided for describing a modification of the joining of the engine hanger.

Alternatively, as shown in FIG. 15, the laser-weld bead 45 may be extended from the engine hanger 37 side.

Figure 16:
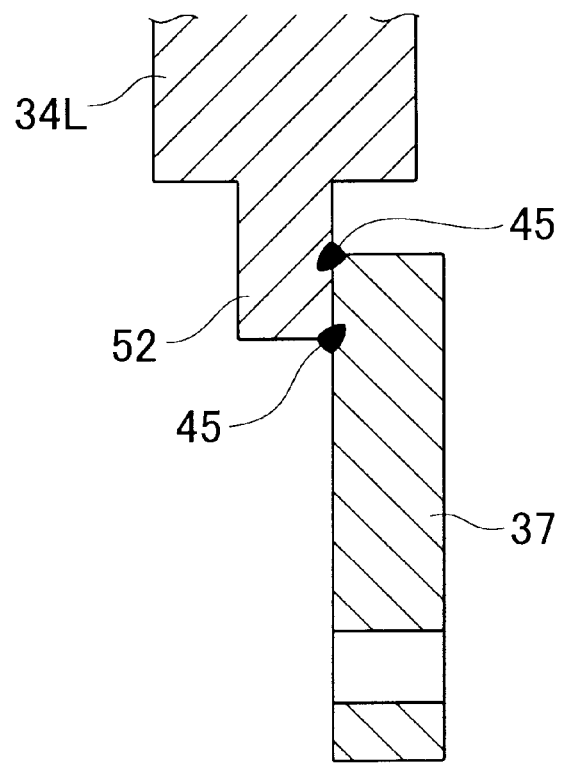
FIG. 16 is another cross-sectional view similar to FIG. 14 for describing another modification of the joining of the engine hanger.

Still alternatively, as shown in FIG. 16, the engine hanger 37 may be joined to the tongue piece 52 with fillet laser-weld beads 45, 45.

Note that the saddle-ride type vehicle is preferably a scooter type vehicle or a motorcycle, but a three-wheeled buggy and a four-wheeled buggy including a head pipe are applicable as well.

INDUSTRIAL APPLICABILITY

The present invention is preferable as a vehicle body frame for a saddle-ride type vehicle.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

EXPLANATION OF REFERENCE NUMERALS

10 SADDLE-RIDE TYPE VEHICLE
11 FRONT WHEEL

12 STEERING SHAFT
13 REAR WHEEL
14 SWINGARM
15 ENGINE
30 VEHICLE BODY FRAME
31 HEAD PIPE
32 MAIN FRAME
33 PIVOT SHAFT
34 PIVOT FRAME
34L LEFT PIVOT FRAME
34R RIGHT PIVOT FRAME
38 CROSS MEMBER
40 GROOVED MEMBER
41 WEB
42 FLANGE
44 LID MEMBER
45 LASER-WELD BEAD
47 RIB
51 LONGITUDINAL AXIS OF LEFT PIVOT FRAME

What is claimed is:

1. A vehicle body frame for a saddle-ride type vehicle, said vehicle body frame comprising: a head pipe which pivotally supports a steering shaft for steering a front wheel; a main frame having a front end welded to the head pipe and extending from the front end toward a rear of the vehicle; and a pivot frame having a front end which is connected to a rear portion of the main frame and extending toward the rear of the vehicle, the pivot frame configured to pivotally support a swing arm thereon via a pivot shaft, with a rear wheel supported at an end of the swing arm opposite the pivot frame, wherein at least one of the main frame and the pivot frame includes:
a grooved member having an opening facing a center of a vehicle body,
a lid member put on the opening of the grooved member, and
a laser-weld bead, with which the lid member and the grooved member are joined to each other,
wherein the grooved member is manufactured by any one of forging and casting and includes a web and a pair of flanges extending toward the center of the vehicle body respectively from opposite edges of the web, and includes a rib extending toward the center of the vehicle body from the web between the pair of flanges, and the lid member is joined to the rib.

2. The vehicle body frame for a saddle-ride type vehicle according to claim 1, wherein the rib extends in a longitudinal direction of the grooved member.

3. The vehicle body frame for a saddle-ride type vehicle according claim 1, wherein the main frame is a tubular frame, and wherein the pivot frame is the grooved member.

4. The vehicle body frame for a saddle-ride type vehicle according claim 2, wherein the main frame is a tubular frame, and wherein the pivot frame is the grooved member.

5. The vehicle body frame for a saddle-ride type vehicle according to claim 1, wherein the pivot frame includes a cross member on an upper portion thereof, the cross member extending in a vehicle width direction, and wherein the cross member is joined to the pivot frame with a laser-weld bead.

6. The vehicle body frame for a saddle-ride type vehicle according to claim 2, wherein the pivot frame includes a cross member on an upper portion thereof, the cross member extending in a vehicle width direction, and wherein the cross member is joined to the pivot frame with a laser-weld bead.

7. The vehicle body frame for a saddle-ride type vehicle according to claim 3, wherein the pivot frame includes a cross member on an upper portion thereof, the cross member extending in a vehicle width direction, and wherein the cross member is joined to the pivot frame with a laser-weld bead.

8. A motorcycle comprising a vehicle body frame, said vehicle body frame comprising:
a head pipe which pivotally supports a steering shaft for steering a front wheel;
a main frame having a front end welded to the head pipe and extending from the front end toward a rear of the vehicle; and
a pivot frame having a front end which is connected to a rear portion of the main frame and extending toward the rear of the vehicle, the pivot frame pivotally supporting a swing arm thereon via a pivot shaft, with a rear wheel supported at an end of the swing arm opposite the pivot frame,
wherein at least one of the main frame and the pivot frame includes:
a grooved member having an opening facing a center of a vehicle body,
a lid member put on the opening of the grooved member, and
a laser-weld bead, with which the lid member and the grooved member are joined to each other, and
wherein the grooved member is manufactured by any one of forging and casting and includes a web and a pair of flanges extending toward the center of the vehicle body respectively from opposite edges of the web, and includes a rib extending toward the center of the vehicle body from the web between the pair of flanges, and the lid member is joined to the rib.

9. The motorcycle according to claim 8, wherein the rib extends in a longitudinal direction of the grooved member.

10. The motorcycle according claim 8, wherein the main frame is a tubular frame, and wherein the pivot frame is the grooved member.

11. The motorcycle according to claim 8, wherein the pivot frame includes a cross member on an upper portion thereof, the cross member extending in a vehicle width direction, and wherein the cross member is joined to the pivot frame with a laser-weld bead.

* * * * *